United States Patent
Najima et al.

(10) Patent No.: US 7,300,977 B2
(45) Date of Patent: Nov. 27, 2007

(54) ACRYLIC MODIFIED CHLORINATED POLYOLEFIN RESIN, PROCESS FOR PRODUCING THE SAME, AND COATING COMPOSITION CONTAINING THE SAME FOR POLYOLEFIN MATERIAL

(75) Inventors: Mitsuo Najima, Tokyo (JP); Takashi Isogai, Saitama (JP)

(73) Assignee: Fujikura Kasei Co., Ltd., Tokyo (JP)

( * ) Notice: Subject to any disclaimer, the term of this patent is extended or adjusted under 35 U.S.C. 154(b) by 0 days.

(21) Appl. No.: 10/519,464

(22) PCT Filed: Feb. 17, 2004

(86) PCT No.: PCT/JP2004/001714

§ 371 (c)(1),
(2), (4) Date: Dec. 23, 2004

(87) PCT Pub. No.: WO2004/074337

PCT Pub. Date: Sep. 2, 2004

(65) Prior Publication Data

US 2005/0256272 A1 Nov. 17, 2005

(30) Foreign Application Priority Data

Feb. 18, 2003 (JP) .............................. 2003-039987

(51) Int. Cl.
*C08L 51/06* (2006.01)
*C08F 255/00* (2006.01)
(52) U.S. Cl. ..................... 525/64; 525/69; 525/301; 525/359.1; 525/285; 525/312; 524/504

(58) Field of Classification Search .................. 525/64, 525/69, 301, 359.1, 285, 312; 524/504
See application file for complete search history.

(56) References Cited

U.S. PATENT DOCUMENTS

| 4,304,838 A | 12/1981 | Hasegawa et al. |
| 4,683,264 A | 7/1987 | Urata et al. .................... 524/65 |
| 5,143,976 A * | 9/1992 | Ashihara et al. ............ 525/227 |
| 5,580,933 A | 12/1996 | Verge et al. |

(Continued)

FOREIGN PATENT DOCUMENTS

GB 876535 9/1961

(Continued)

OTHER PUBLICATIONS

Supplemental European Search Report from related European Patent Application, Feb. 22, 2007 (3 pgs).

*Primary Examiner*—James J. Seidleck
*Assistant Examiner*—Olga Asinovsky
(74) *Attorney, Agent, or Firm*—Grossman, Tucker, Perreault & Pfleger, PLLC

(57) ABSTRACT

This method for preparing an acrylic-modified chlorinated polyolefin resin comprises graft-copolymerizing an acid-modified chlorinated polyolefin resin with a monomer mixture containing a (meth)acrylate ester monomer having one hydroxyl group and another vinyl monomer in the presence of a cyclic ether compound. Also, the cyclic ether compound may be added in an amount of 1 to 100 parts by weight based on 100 parts by weight of the acid-modified chlorinated ployolefin resin, and the cyclic ether compound may be dioxane and/or 1,3-dioxolane.

5 Claims, No Drawings

U.S. PATENT DOCUMENTS

| | | |
|---|---|---|
| 5,589,933 A | 12/1996 | Osgood et al. |
| 5,840,783 A | 11/1998 | Momchilovich et al. |
| 5,916,948 A | 6/1999 | Kimura ............... 524/458 |
| 6,861,471 B2 | 3/2005 | Masuda et al. ............ 525/242 |
| 2003/0162887 A1 | 8/2003 | Mitsui et al. |

FOREIGN PATENT DOCUMENTS

| | | |
|---|---|---|
| JP | 62095372 | 5/1987 |
| JP | 62138503 | 6/1987 |
| JP | 09-169947 | 6/1997 |
| JP | 10-204372 | 8/1998 |
| JP | 11-189696 | 7/1999 |
| WO | 02064690 | 8/2002 |

\* cited by examiner

ACRYLIC MODIFIED CHLORINATED POLYOLEFIN RESIN, PROCESS FOR PRODUCING THE SAME, AND COATING COMPOSITION CONTAINING THE SAME FOR POLYOLEFIN MATERIAL

TECHMICAL FIELD

The present invention relates to an acrylic-modified chlorinated polyolefin resin which has excellent adhesion to materials made of polyolefinic resins such as polypropylene (PP), a method for preparing the resin, and a coating composition for polyolefin material, containing the resin.

BACKGROUND ART

Polyolefinic resins such as polypropylene have widely been used as materials for automobile parts because of excellent properties and low price. Unlike synthetic resins having polarity such as polyurethane resin, polyamide resin, acrylic resin and polyester resin, polyolefinic resins have no polarity and also have crystallinity, and thus they are not suited for coating and bonding.

To solve such a problem, there has hitherto been made trials to improve adhesion by activating the surface of a material made of the polyolefinic resin due to a plasma treatment or a gas flaming treatment. However, this method has drawbacks such as complicated processes, high equipment cost, large time loss, and variation in surface treatment effect due to an influence of complicated shape of the material, pigments and additives.

As disclosed in Japanese Patent Application, Second Publication No. Hei 6-2771, for example, various methods using a primer composition employed in the case of coating an automobile bumper with polypropylene have been proposed as a coating method without using such a surface treatment (pretreatment).

As disclosed in Japanese Patent Application, Second Publication No. Hei 1-16414, the primer composition includes, for example, a composition containing, as a main component, a chlorinated polyolefinic resin obtained by modifying polyolefins with an unsaturated carboxylic acid and/or its acid anhydride. Also, in Japanese Patent Application, Second Publication No. Hei 3-60872, the effect suited for use as a binder deposited to both a polyolefin and the other polar resin is confirmed by graft copolymerization of a chlorinated polypropylene and a liquid rubber with a polymerizable unsaturated compound.

However, these chlorinated polyolefinic resins have poor compatibility with acrylic, polyester and polyurethane resins contained in a primer composition and a top coating composition, and thus it is difficult to form a uniform film. Also, in the case of a modified composition using a liquid rubber, the resulting coating film sometimes exhibits tack, and thus compatibility and solution stability cannot be sufficiently improved.

As disclosed in Japanese Patent Application, First Publication No. 2002-309161, it has been found that compatibility and solution stability are improved by an. acrylic-modified chlorinated polyolefin obtained by bonding an acid-modified chlorinated polyolefin with a hydroxyl group-containing (meth)acrylate ester via an ester bond, thereby to introduce a double bond into the acid-modified chlorinated polyolefin, and graft-copolymerizing a (meth)acrylic acid monomer.

However, a coating composition for polyolefin material containing a resin obtained by the method for preparing an acrylic-modified chlorinated polyolefin disclosed in Japanese Patent Application, First Publication No. 2002-309161 has a fatal defect of properties of a coating composition, that is, phase separation occurs during the storage of the coating composition because of poor stability of the composition itself. Furthermore, since all components of the composition cannot be uniformly dissolved and lumps remain, "seeding" occurs in a coating film made of the composition and the coating film has poor appearance.

DISCLOSURE OF THE INVENTION

An object of the present invention is to solve the above problems of the prior art and to provide a coating composition for polyolefin material, containing an acrylic-modified chlorinated polyolefin resin, which is excellent in adhesion to a material containing a polyolefinic resin, properties of the coating composition, and high-temperature stability and low-temperature stability, and is also capable of forming a coating film having excellent appearance without causing "seeding".

The present inventors have intensively researched and found that an acrylic-modified chlorinated polyolefin resin capable of achieving the object of the present invention can be prepared by carrying out the polymerization reaction in the presence of a cyclic ether compound in the case of polymerizing an acid-modified chlorinated polyolefin resin with a monomer mixture containing a (meth)acrylate ester monomer having a hydroxyl group and the other vinyl monomer.

A first aspect of the present invention is directed to a method for preparing an acrylic-modified chlorinated polyolefin resin, which comprises graft-copolymerizing an acid-modified chlorinated polyolefin resin with a monomer mixture containing a (meth)acrylate ester monomer having one hydroxyl group and another vinyl monomer in the presence of a cyclic ether compound.

The cyclic ether compound may be added in the amount of 1 to 100 parts by weight based on 100 parts by weight of the acid-modified chlorinated polyolefin resin.

The cyclic ether compound may be dioxane and/or 1,3-dioxolane.

A second aspect of the present invention is directed to an acrylic-modified chlorinated polyolefin resin obtained by graft-copolymerizing an acid-modified chlorinated polyolefin resin with a monomer mixture containing a (meth)acrylate ester monomer having one hydroxyl group and another vinyl monomer in the presence of a cyclic ether compound.

A third aspect of the present invention is directed to a coating composition for polyolefin material, comprising at least the above acrylic-modified chlorinated polyolefin resin and 5 to 40% by weight of an acid-modified chlorinated polyolefin resin.

BEST MODE FOR CARRYING OUT THE INVENTION

In the first step of preparing an acrylic-modified chlorinated polyolefin resin of the present invention, at least one polyolefin is graft-polymerized with at least one acidic monomer selected from an $\alpha,\beta$-unsaturated carboxylic acid and acid anhydrides thereof to form an acid-modified polyolefin.

In the present invention, "polyolefin" may be crystalline or amorphous and refers to a polypropylene- or propylene-$\alpha$-olefin copolymer. The "propylene-$\alpha$-olefin copolymer"

refers to a copolymer obtained by copolymerizing propylene as a main component with an α-olefin. As the α-olefin, for example, ethylene, 1-butene, 1-heptene, 1-octene and 4-methyl-1-pentene can be used alone or in combination. Although the ratio of a propylene component to an α-olefin component in the propylene-α-olefin copolymer is not specifically limited, the content of the propylene component is preferably 50 mol % or more.

In the present invention, the α,β-unsaturated carboxylic acid or acid anhydrides thereof to be graft-copolymerized with the polyolefin includes, for example, maleic acid, itaconic acid, citraconic acid, and acid anhydrides thereof. Among these, acid anhydrides are preferable and maleic anhydride and itaconic anhydride are particularly preferable. The amount to be graft-copolymerized is preferably from 0.1 to 10% by weight, and more preferably from 1 to 5% by weight.

The method for graft-copolymerizing the polyolefin with the α,β-unsaturated carboxylic acid or acid anhydrides thereof includes a known method such as solution or melting method in the presence of an organic peroxide as a radical generator.

Examples of the organic peroxide, which can be used as a radical generator, include benzoyl peroxide, dicumyl peroxide and di-t-butyl peroxide, and the organic peroxide is appropriately selected according to the reaction temperature and the decomposition temperature.

Then, the acid-modified polyolefin obtained by the above method is chlorinated to obtain an acid-modified chlorinated polyolefin resin. Preferably, the resin contains 10 to 40% by weight of chlorine. The chlorination method may be any known method.

The acid-modified chlorinated polyolefin resin which can be used in the present invention includes, for example, Hard Resin M-28 (manufactured by Toyo Kasei Kogyo Co., Ltd., chlorination degree: 20%, solid content: 20%, toluene solution).

Subsequently, the acid-modified chlorinated polyolefin resin obtained by the above method is polymerized with a monomer mixture containing a (meth)acrylate ester monomer having one hydroxyl group and the other vinyl monomer in the presence of a cyclic ether compound to obtain an acrylic-modified chlorinated polyolefin resin of the present invention.

In the present invention, the "(meth)acrylate ester monomer having one hydroxyl group" refers to a (meth)acrylate ester monomer having only one hydroxyl group used so as to react with an acid-modified chlorinated polyolefin resin thereby esterifying the resin. It is not preferred to use a (meth)acrylate ester monomer having two or more hydroxyl groups because the crosslinking reaction starts at the stage of bonding via an ester bond and thus gelation occurs.

Examples of the "(meth)acrylate ester monomer having one hydroxyl group" include hydroxyethyl acrylate, hydroxypropyl acrylate, polypropylene glycol acrylate, hydroxyethyl methacrylate, hydroxypropyl methacrylate and polypropylene glycol methacrylate.

In the present invention, the "other vinyl monomer" refers to any monomer other than the above-described "(meth)acrylate ester monomer having one hydroxyl group". The monomer includes a (meth)acrylic acid monomer and specific examples thereof include methyl acrylate, ethyl acrylate, propyl acrylate, n-butyl acrylate, isobutyl acrylate, t-butyl acrylate, 2-ethylhexyl acrylate, lauryl acrylate, stearyl acrylate, cyclohexyl acrylate, methyl methacrylate, ethyl methacrylate, propyl methacrylate, n-butyl methacrylate, isobutyl methacrylate, t-butyl methacrylate, 2-ethylhexyl methacrylate, lauryl methacrylate, stearyl methacrylate, cyclohexyl methacrylate, and methoxypolyethylene glycol monomethacrylate (n=2 to 90) represented by the formula 1:

Formula 1

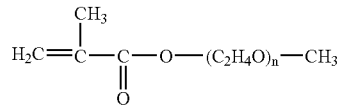

In the present invention, the "cyclic ether compound" refers to any cyclic ether compound which can be added when the acid-modified chlorinated polyolefin resin is graft-copolymerized with an acrylic monomer in the polymerization reaction.

One of objects of the present invention is that, when the cyclic ether is added in case of the above-described graft copolymerization, an acrylic-modified (graft) chlorinated polyolefin resin having excellent physical properties can be obtained as a final product. While not intending to be bound by any specific theory, it is expected that the cyclic ether compound is bonded with an acid anhydride in the case of graft copolymerization and, after forming a coating film, the cyclic ether compound is removed from the coating film during drying.

Examples of the cyclic ether compound include dioxane, 1,4-dioxane-2,3-diol and 1,3-dioxolane; examples of the oxetane compound include 2-methyl-2-hydroxymethyl-1,3-epoxypropane, β-propiolactone and mono- and dimethylpropiolactone; and examples of the furan compound include furan, 2,3-dihydrofuran, 2,5-dihydrofuran, tetrahydrofuran, 2,2,5,5-tetramethyltetrahydrofuran and 2-heptyltetrahydrofuran. Among these compounds, dioxane, 1,3-dioxolane and tetrahydrofuran can be used particularly preferably.

In an embodiment of the present invention, the cyclic ether compound is preferably added during the graft copolymerization reaction in an amount of 1 to 100 parts by weight based on 100 parts by weight of the acid-modified chlorinated polyolefin resin. That is, the cyclic ether compound may exist in a trace amount of 1 part by weight based on the composition and is at most 100 parts by weight in view of cost.

The conditions of the graft copolymerization reaction used in the present invention are as follows. In the presence of a radical generator, any known reaction may be used. As the radical generator, organic peroxides such as benzoyl peroxide, and azo compounds such as azobisisobutyronitrile and dimethyl 2,2-azobisisobutyrate can be used.

In another embodiment of the present invention, there is provided a method for preparing the above acrylic-modified chlorinated polyolefin resin, which comprises graft-copolymerizing an acid-modified chlorinated polyolefin resin containing 10 to 40% by weight of chlorine with a monomer mixture containing a (meth)acrylate ester monomer having one hydroxyl group and the other vinyl monomer in the presence of a cyclic ether compound.

In still another embodiment of the present invention, there is provided a coating composition for polyolefin material, comprising the acrylic-modified chlorinated polyolefin resin of the present invention, and the composition of the present invention contains 5 to 40% by weight of the acid-modified chlorinated polyolefin resin. As used herein, the "content of 5 to 40% by weight" refers to the fact that the content of the acid-modified chlorinated polyolefin resin in the solid content of the coating composition for polyolefin material is from 5 to 40% by weight.

When the content of the acid-modified chlorinated polyolefin resin in the solid content of the coating composition for polyolefin material is 5% by weight or more, the composition is excellent in adhesion to a material containing a polyolefinic resin. When the content is 40% by weight or less, the composition is excellent in properties of the coating composition and has good high-temperature stability and low-temperature stability. Furthermore, when containing the acrylic-modified chlorinated polyolefin resin of the present invention, a coating film having excellent appearance can be formed without causing "seeding" when the coating film is made of the composition.

In the composition of the present invention, pigments can be added and dispersed. As the pigment, inorganic pigments such as carbon black, titanium dioxide, talc, zinc white and aluminum paste, and organic pigments such as azo pigment can be used. The resulting resin composition solution is a uniform solution in the case of a practical concentration, and a coating film obtained by casting the solution into a film is uniform and transparent. Therefore, when used as a one-coat coating composition, a coating with an excellent coating gloss is obtained.

EXAMPLES

The present invention will now be described in detail by way of examples; however, the present invention is not limited thereto.

Preparation Example 1

(Preparation of Resin A)

In a 2 liter four-necked flask equipped with a condenser, a thermometer, a monomer dropping apparatus and a stirrer, 800 g of Hard Resin M-28 (acid-modified chlorinated polypropylene manufactured by Toyo Kasei Kogyo Co., Ltd., chlorination degree: 20%, solid content: 20%, toluene solution), 4 g of 1,3-dioxolane and 2.4 g of benzoyl peroxide (BPO) as a polymerization initiator were charged. After raising the inner temperature of the flask to 85° C., a vinyl monomer mixture of 160 g of methyl methacrylate (MMA), 80 g of cyclohexyl methacrylate (CHMA), 100 g of 2-ethylhexyl methacrylate (EHMA), 60 g of hydroxyethyl acrylate (HEA) and 56 g of toluene was added dropwise over for 3 hours, and then the reaction was continued at the same temperature for 3 hours to obtain an acrylic-modified chlorinated polyolefin resin (resin A) having a resin solid content of 45%.

Preparation Example 2

(Preparation of Resin B)

In the same manner as in Example 1, except that 40 g of 1,3-dioxolane was added and no toluene was added, an acrylic-modified chlorinated polyolefin resin (resin B) having a resin solid content of 45% was obtained.

Preparation Example 3

(Preparation of Resin C)

In the same manner as in Example 1, except that 80 g of 1,3-dioxolane was added and no toluene was added, an acrylic-modified chlorinated polyolefin resin (resin C) having a resin solid content of 44% was obtained.

Preparation Example 4

(Preparation of Resin D)

In the same manner as in Example 1, except that 112 g of 1,3-dioxolane was added and no toluene was added, an acrylic-modified chlorinated polyolefin resin (resin D) having a resin solid content of 43% was obtained.

Preparation Example 5 (Comparative Example)

(Preparation of Resin E)

In the same manner as in Example 1, except that no 1,3-dioxolane was added and 40 g of toluene was added, an acrylic-modified chlorinated polyolefin resin (resin E) having a resin solid content of 45% was obtained.

Formulations of the resins A to E disclosed in Preparation Examples 1 to 5 are as shown in Table 1 below.

TABLE 1

| | Resin A | Resin B | Resin C | Resin D | Resin E |
|---|---|---|---|---|---|
| Initial charge | | | | | |
| M-28 (g) | 800 | 800 | 800 | 800 | 800 |
| 1,3-dioxolane (g) | 4 | 40 | 80 | 112 | — |
| BPO (g) | 2.4 | 2.4 | 2.4 | 2.4 | 2.4 |
| Monomer mixture to be added dropwise | | | | | |
| MMA (g) | 160 | 160 | 160 | 160 | 160 |
| CHMA (g) | 80 | 80 | 80 | 80 | 80 |
| EHMA (g) | 100 | 100 | 100 | 100 | 100 |
| HEA (g) | 60 | 60 | 60 | 60 | 60 |
| Toluene (g) | 56 | — | — | — | 40 |
| Solid content (%) | 45 | 45 | 44 | 43 | 45 |

Examples 1 to 8 and Comparative Examples 1 to 2

The acrylic-modified chlorinated polyolefin resins (resins A to D) of the present invention and an acrylic-modified chlorinated polyolefin resin (resin E) of the prior art were appropriately selected and mixed to obtain the following coating compositions for polyolefin material of Examples 1 to 8 and Comparative Examples 1 to 2.

Example 1 resin A, 100 parts by weight

Example 2 resin C, 100 parts by weight

Example 3 resin C, 90 parts by weight; acid-modified chlorinated polyolefin resin (M-28), 10 parts by weight Example 4 resin C, 50 parts by weight; acrylpolyol A, 50 parts by weight

Example 5 resin C, 20 parts by weight; acrylpolyol A, 80 parts by weight

Example 6 resin C, 50 parts by weight; acrylpolyol B, 50 parts by weight

Example 7 resin B, 100 parts by weight

Example 8 resin D, 100 parts by weight

Comparative Example 1 resin E, 100 parts by weight

Comparative Example 2 resin E, 90 parts by weight; 1,3-dioxolane, 10 parts by weight

Furthermore, high-temperature stability and low-temperature stability (properties of coating composition) of the resulting coating composition for polyolefin material of Examples 1 to 8 and Comparative Examples 1 to 2 as well as appearance of the coating film were evaluated. Also, initial adhesion and adhesion after a hot water resistance test were evaluated. The evaluation was performed by the following procedure.

1. Stability of coating composition: Each of the coating compositions of Examples 1 to 8 and Comparative Examples 1 to 2 was stored under the following conditions.
1-1. High-temperature stability test: The coating composition was stored at 40° C. for 240 hours.
1-2. Low-temperature stability test: The coating composition was stored at −20° C. for 240 hours.

2. Evaluation of properties of coating composition: After the stability test 1, each coating composition was further allowed to stand at normal temperature for about 3 hours. Then, properties of the coating composition were visually observed and evaluated by the following criteria.
   1: almost the same viscosity as initial viscosity was maintained
   2: increase in viscosity and separation were observed
   3: severe increase in viscosity and separation were observed
3. Evaluation of appearance of coating film: After the stability test 1, each coating composition for polyolefin material was applied on a polyolefin plate using an applicator so that the thickness of the dry coating film became 25 μm, and this was then allowed to stand at normal temperature for about 30 minutes. Appearance of the coating film was visually observed and evaluated by the following criteria.
   4: almost the same gloss as initial gloss was maintained
   5: gloss deteriorated
   6: gloss severely deteriorated
4. Evaluation of initial adhesion and adhesion after hot water resistance test: Each coating composition was applied on a polyolefin plate using an applicator so that the thickness of the dry coating film became 25 μm, and this was then dried at 80° C. for 30 minutes. The resulting test plate was subjected to evaluation of initial adhesion and adhesion after a hot water resistance test. The hot water resistance test was conducted by dipping the test plate in hot water at 40° C. for 72 hours and, after taking out the test plate, it was subjected to an adhesion test. The adhesion test was conducted according to a cross-cut adhesion method described in JIS K5400 and the results were evaluated by the following criteria.
   7: no peeling was observed on the surface of the coating film
   8: peeling was observed on the surface of the coating film The amounts of components such as resin of the coating compositions for polyolefin material of Examples 1 to 8 and Comparative Examples 1 to 2 as well as the evaluation results of the respective tests are shown in Table 2 below.

TABLE 2

|  | Examples | | | | | | | | Comparative Examples | |
| --- | --- | --- | --- | --- | --- | --- | --- | --- | --- | --- |
|  | 1 | 2 | 3 | 4 | 5 | 6 | 7 | 8 | 1 | 2 |
| Acrylpolyol A (parts by weight) |  |  |  | 50 | 80 |  |  |  |  |  |
| Acrylpolyol B (parts by weight) |  |  |  |  |  | 50 |  |  |  |  |
| Resin A (parts by weight) | 100 |  |  |  |  |  |  |  |  |  |
| Resin B (parts by weight) |  |  |  |  |  |  | 100 |  |  |  |
| Resin C (parts by weight) |  | 100 | 90 | 50 | 20 | 50 |  |  |  |  |
| Resin D (parts by weight) |  |  |  |  |  |  |  | 100 |  |  |
| Resin E (parts by weight) |  |  |  |  |  |  |  |  | 100 | 90 |
| Modified Cl-PP resin (M-28) (parts by weight) |  |  | 10 |  |  |  |  |  |  |  |
| 1,3-dioxolane (added later) (parts by weight) |  |  |  |  |  |  |  |  |  | 10 |
| Content of 1,3-dioxolane to modified Cl-PP resin (%) | 2.5 | 50 | 18.2 | 50 | 50 | 50 | 25 | 70 | 0 | 35 |
| Content of modified Cl-PP resin (%) | 28.6 | 28.6 | 35.7 | 14.3 | 5.7 | 14.3 | 28.6 | 28.6 | 28.6 | 28.6 |
| High-temperature stability (Properties of coating composition) | *1 | *1 | *1 | *1 | *1 | *1 | *1 | *1 | *3 | *3 |
| High-temperature stability (Appearance of coating film) | *4 | *4 | *4 | *4 | *4 | *4 | *4 | *4 | *6 | *6 |
| Low-temperature stability (Properties of coating composition) | *1 | *1 | *1 | *1 | *1 | *1 | *1 | *1 | *3 | *2 |

TABLE 2-continued

|  | Examples | | | | | | | | Comparative Examples | |
| --- | --- | --- | --- | --- | --- | --- | --- | --- | --- | --- |
|  | 1 | 2 | 3 | 4 | 5 | 6 | 7 | 8 | 1 | 2 |
| Low-temperature stability (Appearance of coating film) | *4 | *4 | *4 | *4 | *4 | *4 | *4 | *4 | *6 | *5 |
| Initial adhesion | *7 | *7 | *7 | *7 | *7 | *7 | *7 | *7 | *7 | *7 |
| Hot water resistance | *7 | *7 | *7 | *7 | *7 | *7 | *7 | *7 | *7 | *7 |

Acrylpolyol A: Mn = 8000, Mw = 20000, Tg = 50° C., Hydroxyl value = 30 mgKOH/g
Acrylpolyol B: Mn = 12000, Mw = 29000, Tg = 49° C., Hydroxyl value = 68 mgKOH/g As is apparent from Table 2, the coating compositions for polyolefin material of the present invention are excellent in both high-temperature stability and low-temperature stability of the coating composition and are excellent in appearance of the coating film, and are also excellent in initial adhesion and adhesion after a hot water resistance test, as compared with the compositions of the prior art.

INDUSTRIAL APPLICABILITY

According to the method for preparing an acrylic-modified chlorinated polyolefin resin of the present invention, since an acid-modified chlorinated polyolefin resin is graft-copolymerized with a monomer mixture containing a (meth)acrylate ester monomer having one hydroxyl group and the other vinyl monomer in the presence of a cyclic ether compound, it is made possible to prepare an acrylic-modified chlorinated polyolefin resin which exhibits excellent high-temperature stability and low-temperature stability (properties of coating film) and is also capable of forming a coating film which has good appearance and exhibits good initial adhesion and good adhesion after a hot water resistance test.

The invention claimed is:

1. A method for preparing an acrylic-modified chlorinated polyolefin resin, which comprises graft-copolymerizing an acid-modified chlorinated polyolefin resin with a monomer mixture containing a (meth) acrylate ester monomer having one hydroxyl group and another vinyl monomer in the presence of one or more of cyclic ether compounds selected from the group consisting of dioxane, 1,4-dionaxane-2,3-diol 1,3-dioxolane, β-propiolactone, monomethylpropiolactone, dimethyl propiolactone, furan, 2,3-dihydrofuran, 2,5-dihydrofuran, tetrahydrofuran, 2,2,5,5-tetramethyltetrahydrofuran, and 2-heptyltetrahydrofuran.

2. The method for preparing an acrylic-modified chlorinated polyolefin resin according to claim 1, wherein the cyclic ether compound is added in the amount of 1 to 100 parts by weight based on 100 parts by weight of the acid-modified chlorinated polyolefin resin.

3. The method for preparing an acrylic-modified chlorinated polyolefin resin according to claim 1, wherein the cyclic ether compound is dioxane and/or 1,3-dioxolane.

4. An acrylic-modified chlorinated polyolefin resin obtained by graft-copolymerizing an acid-modified chlorinated polyolefin resin with a monomer mixture containing a (meth) acrylate ester monomer having one hydroxyl group and another vinyl monomer in the presence of one or more of cyclic ether compounds selected from the group consisting of dioxane, 1,4-dionaxane-2,3-diol 1,3-dioxolane, β-propiolactone, monomethylpropiolactone, dimethyl propiolactone, furan, 2,3-dihydrofuran, 2,5-dihydrofuran, tetrahydrofuran, 2,2,5,5 -tetramethyltetrahydrofuran, and 2-heptyltetrahydrofuran.

5. A coating composition for polyolefin material, comprising: at least the acrylic-modified chlorinated polyolefin resin according to claim 4; and 5 to 40% by weight of an acid-modified chlorinated in resin.

* * * * *

UNITED STATES PATENT AND TRADEMARK OFFICE
CERTIFICATE OF CORRECTION

PATENT NO. : 7,300,977 B2  Page 1 of 1
APPLICATION NO. : 10/519464
DATED : November 27, 2007
INVENTOR(S) : Najima et al.

It is certified that error appears in the above-identified patent and that said Letters Patent is hereby corrected as shown below:

On the face page, in field (57), under "Abstract", in column 2, line 9, delete "ployolefin" and insert -- polyolefin --, therefor.

In column 9, line 42, in Claim 1, delete "(meth) acrylate" and insert -- (meth)acrylate --, therefor.

In column 10, line 31, in Claim 4, delete "(meth) acrylate" and insert -- (meth)acrylate --, therefor.

In column 10, line 42, in Claim 5, delete "in" and insert -- polyolefin --, therefor.

Signed and Sealed this

Twenty-third Day of September, 2008

JON W. DUDAS
*Director of the United States Patent and Trademark Office*